United States Patent
Crew et al.

(10) Patent No.: US 10,759,951 B2
(45) Date of Patent: Sep. 1, 2020

(54) PARAFFIN DEPOSITION INHIBITOR COATINGS

(71) Applicant: Ecolab USA Inc., St. Paul, MN (US)

(72) Inventors: Benjamin Crew, Eagan, MN (US); Kim R. Solomon, River Falls, WI (US); Carter M. Silvernail, Burnsville, MN (US)

(73) Assignee: Ecolab USA Inc., St. Paul, MN (US)

( * ) Notice: Subject to any disclaimer, the term of this patent is extended or adjusted under 35 U.S.C. 154(b) by 251 days.

(21) Appl. No.: 15/632,963

(22) Filed: Jun. 26, 2017

(65) Prior Publication Data

US 2017/0369718 A1 Dec. 28, 2017

Related U.S. Application Data

(60) Provisional application No. 62/355,378, filed on Jun. 28, 2016.

(51) Int. Cl.

| | | |
|---|---|---|
| *C09D 7/40* | (2018.01) | |
| *C09D 5/08* | (2006.01) | |
| *F17D 1/08* | (2006.01) | |
| *C09D 133/02* | (2006.01) | |
| *C09K 8/524* | (2006.01) | |
| *F16L 58/10* | (2006.01) | |
| *B65D 90/04* | (2006.01) | |
| *C08F 220/06* | (2006.01) | |
| *C08L 25/04* | (2006.01) | |
| *C11D 1/00* | (2006.01) | |

(52) U.S. Cl.
CPC ............... *C09D 7/40* (2018.01); *B65D 90/04* (2013.01); *C08F 220/06* (2013.01); *C08L 25/04* (2013.01); *C09D 5/08* (2013.01); *C09D 133/02* (2013.01); *C09K 8/524* (2013.01); *C11D 1/008* (2013.01); *F16L 58/10* (2013.01); *F16L 58/1009* (2013.01); *F16L 58/1027* (2013.01); *F17D 1/08* (2013.01)

(58) Field of Classification Search
CPC ........ C09D 133/02; C09D 5/08; C09K 8/524; F17D 1/08; F16L 58/00; F16L 58/02; F16L 58/04; F16L 58/10; F16L 58/1009; F16L 58/1027; F16L 58/1036; F16L 58/1045; C08K 3/017; B65D 90/04
See application file for complete search history.

(56) References Cited

U.S. PATENT DOCUMENTS

| | | | | |
|---|---|---|---|---|
| 4,510,181 | A * | 4/1985 | Okuno ................... | F16L 58/10 156/187 |
| 4,697,426 | A * | 10/1987 | Knowles, Jr. .......... | F17D 1/005 137/13 |
| 5,081,209 | A * | 1/1992 | Wu .......................... | C09D 5/08 526/224 |
| 2001/0030004 | A1* | 10/2001 | Kushida ............... | B23K 9/0253 148/325 |
| 2002/0040787 | A1* | 4/2002 | Cook ..................... | E21B 7/208 166/379 |
| 2005/0154109 | A1 | 7/2005 | Li et al. | |
| 2005/0166797 | A1 | 8/2005 | Li et al. | |
| 2008/0199714 | A1* | 8/2008 | Witteler .................. | C09D 5/08 428/545 |
| 2008/0260959 | A1* | 10/2008 | Gonzalez ............... | C09D 5/086 427/487 |
| 2008/0264445 | A1 | 10/2008 | Levitt et al. | |
| 2014/0020783 | A1* | 1/2014 | Zazovsky ................ | F16L 9/00 138/141 |
| 2015/0167706 | A1* | 6/2015 | Legros ..................... | C09D 4/06 138/145 |

FOREIGN PATENT DOCUMENTS

WO 2007/074519 A1 7/2007

OTHER PUBLICATIONS

Allnex, Ebecryl 3300 Technical Data Sheet (2017).*
International Search Report for International Application No. PCT/US2017/039232, dated Sep. 11, 2017 (5 pages).
Written Opinion for International Application No. PCT/US2017/039232, dated Sep. 11, 2017 (6 pages).
Omnova Solutions, Technical Data Sheet, MOR-FLO REZ 510A, Formerly Conrez 510A Acrylic terpolymer emulsion, Jun. 2012, 1 page.
Rohm and Haas, ACUSOL 445/445N/445ND, Detergent Polymers for Industrial Machine Dishwash (Warewash), Jul. 2006, 5 pages.

* cited by examiner

*Primary Examiner* — Kregg T Brooks
(74) *Attorney, Agent, or Firm* — Kagan Binder, PLLC

(57) ABSTRACT

A containment for crude oil that inhibits paraffin deposition thereon is described. One to twenty coatings of a composition including a polyacrylate are applied to a crude oil contact surface of a crude oil containment; the polyacrylate includes at least about 50 mole % acrylic acid residues or the conjugate base thereof. The coating compositions are suitably delivered from a water dispersion, solution, or emulsion and dried before applying a subsequent coating. Each of the one to twenty coatings are formed from the same or from different polyacrylate coating compositions. The coated containment surfaces inhibit deposition of at least 10 wt % and as much as 90 wt % of paraffin solids from a crude oil compared to the same crude oil contact in the absence of the one to twenty coatings. The coatings inhibit paraffin deposition at temperatures between about 60° C. and −40° C.

9 Claims, No Drawings

PARAFFIN DEPOSITION INHIBITOR COATINGS

FIELD OF THE INVENTION

The present invention generally relates to inhibiting paraffin deposition on containments for holding crude petroleum products.

BACKGROUND

Crude oil products are globally obtained from subterranean reservoirs using techniques such as drilling and hydraulic fracturing. Transportation of crude oil products from the subterranean reservoir is accomplished by moving and storing the crude oil products in a series of containments, including pipes, pumps, holding tanks, processing tanks, storage tanks, and containers suitable for air, road, or ocean transportation. During such moving and/or storage, the crude oil product is often subjected to ambient temperatures between −40° C. and 60° C.

Crude oil products include linear and branched alkanes having the general formula $C_nH_{2n+2}$ wherein n is typically about 1-50, although minor amounts of longer hydrocarbon chains do occur. The higher molecular weight alkanes can be problematic in that their melting points tend to be greater than ambient temperatures in some cases. For example, nonadecane has a melting point of 33° C.; higher alkanes can have melting points in excess of 60° C.

The high melting alkane fractions present in crude oil products can cause formation of paraffinic residue that solidifies and deposits on containments used to transport and store crude oil. The solidified residue, also known as "paraffin", not only reduces the effective volume of the structure it's contained within but also represents a loss of a valuable component from the body of the crude oil. Excessive paraffin wax buildup reduces the efficiency of transporting crude oil and leads to increased costs related to added downtime for cleaning of the pipes and/or vessels as well as disposal of residues removed from the vessel which increase environmental burden. While the pipelines and vessels can be cleaned to remove the paraffinic residue, the process generates hazardous waste, takes the vessel out of service during the cleaning period, and is expensive.

The formation of paraffin wax can be reduced by conventional additives, called "paraffin inhibitors" (PI) which interfere with the crystallization process of wax and/or suspend wax crystals in the oil. The addition of PI to the crude oil is effective in dispersing the paraffinic residue, thereby reducing the formation of residues in the pipelines and vessels to the benefit of the oil and gas industry. The PI effectively reduce the formation of paraffinic residues during storage and transportation of the crude oil products.

Typical PI are polymers such as e.g. ethylene polymers and copolymers thereof with vinyl acetate, acrylonitrile, or α-olefins such as octene, butene, propylene, and the like; comb polymers with alkyl side chains such as methacrylate ester copolymers, maleic-olefinic ester copolymers, and maleic-olefinic amide copolymers; and branched copolymers having alkyl side chains such as alkylphenol-formaldehyde copolymers and polyethyleneimines.

In order to inhibit paraffin formation a conventional PI must be present within the crude oil itself. That is, conventional PIs are dissolved or dispersed within the crude oil in every instance where it will be contacted with a containment surface. For a continuous flow of crude oil through oil recovery containments such as pipes, therefore, PI must be continuously added. The use of PI increases the material cost of the production stream overall, since it must be added to each aliquot of crude oil that is transported. Additionally, the concentration of the PI in the oil must be continuously monitored and adjusted as it flows from the subterranean reservoir and through or into one or more containments: too low a concentration will result in paraffin deposition; too high a concentration adds to cost without receiving benefit and potentially interferes with the desired actions of one or more other additives also present in the crude oil (corrosion inhibitors, demulsifiers, anti-scaling agents, and the like).

Finally, severe dispensing and usage problems are associated with the use of paraffin inhibitor concentrates in areas where the winter temperature goes well below 0° C. Concentrated formulations of PI in organic solvents are used to provide a pumpable or pourable liquid format for delivery of the PI. However, the polymeric compounds employed as PI tend to solidify at temperatures at or below about 0° C. In such temperatures, the concentrates tend to form gels or even solids with decreasing temperature, leading to severe issues with pumping or pouring the concentrates to affect delivery thereof to the crude oil stream.

There is a need in the industry to overcome the aforementioned issues with conventional paraffin inhibitors.

SUMMARY OF THE INVENTION

Disclosed herein is a containment comprising a coated containment surface, the coated containment surface comprising one to twenty contiguous coatings on a crude oil containment surface thereof, wherein each of the coatings comprises a polyacrylate; and a crude oil contacting the coated containment surface thereof. In embodiments, the crude oil containment surface comprises a metal. In some such embodiments, the metal is a stainless steel. In embodiments, the polyacrylate comprises 50 mole % or greater acrylic acid residue. In embodiments, the polyacrylate is crosslinked. In embodiments, the polyacrylate further comprises the residue of styrene. In embodiments, the coated containment surface further comprises a polyethylene wax or a polypropylene wax. In embodiments, the coated containment surface temperature is 0° C. to −40° C. In embodiments, the coated containment surface inhibits paraffin deposition by the crude oil when compared to the same contact exclusive of the one to twenty contiguous coatings. In embodiments, the coated containment surface inhibits 10 wt % to 90 wt % inhibition of paraffin based on the same contact surface exclusive of the one to twenty coatings. In embodiments, each of the one to twenty contiguous coatings comprises about 0.1 g to 5 g of the coating per square meter of the coated surface.

Also disclosed herein is a method of inhibiting paraffin deposition on a crude oil containment surface, the method comprising: coating at least a portion of a crude oil containment surface with a coating composition comprising a polyacrylate and water to form a wet coating, drying the coating, optionally repeating the coating and drying one to nineteen additional times to form a coated containment surface, and contacting the coated containment surface with a crude oil. In embodiments, the coating comprises coating a vertical surface or an overhead surface. In embodiments, the coating is dip coating. In embodiments, drying is carried out under ambient conditions and the period of drying is about one hour. In embodiments, the one to nineteen additional coatings are applied using the same coating composition. In embodiments, the repeating of the coating and drying is carried out such that the one to nineteen additional coatings are each contiguously applied to a predecessor coating. In embodiments, the contacting is carried out under ambient conditions wherein temperature is about 0° C. to −40° C. In embodiments, the contacting is continuous.

Also disclosed herein is the use of a polyacrylate to coat a crude oil containment surface.

Also disclosed herein is the use of a coated containment surface to contact a crude oil, the coated containment surface comprising one to twenty contiguous coatings wherein each of the coatings comprises a polyacrylate.

Other objects and features will be in part apparent and in part pointed out hereinafter.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, the term "polyacrylate" or "acrylate polymer" means a polymer comprising, consisting essentially of, or consisting of a plurality of repeat units derived from acrylic acid or the conjugate base thereof and a minimum weight-average molecular weight of 1000 g/mol (as determined for the free acid thereof). Recitation of monomer nomenclature related to the polyacrylate will be understood herein to refer to the residue of the recited monomer(s) within a polymer structure, unless otherwise specified. Further, the recitation of "acrylic acid" as a monomer or the polymerized residue thereof means both the free acid and the conjugate base forms thereof as well as mixtures of free acid and conjugate base, unless otherwise specified; for example, where a polyacrylate molecular weight is recited, it may be further specified that all carboxylic functionality present in the polyacrylate is considered to be the free carboxylic acid (or free acid) for purposes of molecular weight recitation and/or calculation.

As used herein, the term "containment" means any article used to contact a crude oil. Containments include by way of example tanks, pipes, pumps, and other articles wherein at least a portion of a surface thereof is intended for contact with a crude oil or may be contacted with a crude oil by occurrences such as spills, leaks, equipment repair, equipment changeovers, and the like and so can include e.g. pipe exteriors, repair equipment surfaces, and the like.

As used herein, the term "crude oil" or "crude oil source" or "crude oil product" means the hydrocarbon product as received from a subterranean reservoir, the product including at least linear and branched alkanes having the general formula $C_nH_{2n+2}$ wherein n is typically about 1-50, and can be greater than 50.

As used herein, the term "paraffin deposition" or "deposited paraffin" indicates a solid material that is deposited on or adhered to one or more containment surfaces as a result of contact of the surface with a crude oil. The term "solid" here means a solid that remains associated with a crude oil contact surface after contact with a crude oil, such that when the crude oil is poured out of the containment, the solid remains associated with the crude oil contact surface. Paraffins include one or more linear and/or branched alkanes having the general formula $C_nH_{2n+2}$ wherein n is about 1 to 50, although minor amounts of longer hydrocarbon chains may further be present particularly as deposited paraffin.

As used herein, the term "crude oil containment surface" means a surface of a containment intended for contact with a crude oil. This will be understood by those of skill to generally mean an interior surface of a containment used to store or transport crude oil, but can also be an exterior surface if desired (for example where crude oil is contacted with a cold exterior pipe or tank surface during extraction and/or filling procedures, equipment repair or changeover, and the like). The crude oil containment surface comprises, consists essentially of, or consists of at least a portion of the surface intended for contact with a crude oil.

As used herein, the term "coated containment" or "coated containment surface" means a crude oil containment surface comprising a paraffin deposition inhibitor deposited thereon in the form of one to twenty contiguous coatings applied thereon. Unless otherwise specified, the coating is substantially free of water on the coated containment surface; that is, the paraffin deposition inhibitor is substantially dried. In some embodiments the coating is crosslinked. In some embodiments, the coating is not substantially free of water and is referred to as a "wet coating".

As used herein, the term "same contact exclusive of the coating" indicates the comparison of a coated containment surface with an uncoated containment surface, wherein contact means contact with a crude oil, further wherein said contact is carried out using the same crude oil source under the same conditions of temperature and time, and otherwise using the same conditions during the contacting.

As used herein, the terms "comprise(s)," "include(s)," "having," "has," "can," "contain(s)," and variants thereof, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values in any way, for example "about 1 to 5", the recitation means "1 to 5" and "about 1 to about 5" and "1 to about 5" and "about 1 to 5" unless specifically limited by context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

DISCUSSION

Paraffin Deposition Inhibitors

Paraffin deposition inhibitors (PDI) are provided in the form of a coating composition for the purpose of coating one or more containment surfaces. A PDI coating composition is a solution, dispersion, or emulsion comprising polyacrylate. The PDI coating composition comprises, consists of, or consists essentially of water and a polyacrylate. The polyacrylate in free acid form has a weight average molecular weight of about 1000 g/mol to 1,000,000 g/mol, for example about 1000 g/mol to 500,000 g/mol, or about 1000 g/mol to 100,000 g/mol, or about 1000 g/mol to 90,000 g/mol, or about 1000 g/mol to 80,000 g/mol, or about 1000 g/mol to 70,000 g/mol, or about 1000 g/mol to 60,000 g/mol, or about 1000 g/mol to 50,000 g/mol, or about 1000 g/mol to 40,000 g/mol, or about 1000 g/mol to 30,000 g/mol, or about 1000 g/mol to 20,000 g/mol, or about 1000 g/mol to 10,000 g/mol, or about 1000 g/mol to 9,000 g/mol, or about 1000 g/mol to 8,000 g/mol, or about 1000 g/mol to 7,000 g/mol, or about 1000 g/mol to 6,000 g/mol, or about 1000 g/mol to 5,000 g/mol, or about 1500 g/mol to 100,000 g/mol, or about 1500 g/mol to 100,000 g/mol, or about 1500 g/mol to 100,000 g/mol, or about 2000 g/mol to 100,000 g/mol, or about 2500 g/mol to 100,000 g/mol, or about 3000 g/mol to 100,000 g/mol, or about 3500 g/mol to 100,000 g/mol, or about 4000 g/mol to 100,000 g/mol, or about 1500 g/mol to 50,000 g/mol, or about 2000 g/mol to 20,000 g/mol, or about 2000 g/mol to 10,000 g/mol, or about 2000 g/mol to 7000 g/mol. Weight average molecular weight is determined using any of the techniques well understood by those of skill to measure weight-average molecular weight of polyacrylates.

In some embodiments, the polyacrylate comprises, consists of, or consists essentially of an acrylic acid homopolymer. In other embodiments, the polyacrylate is a copolymer, terpolymer, or higher interpolymer of acrylic acid. Examples of useful monomers included in the polyacrylate interpolymers include styrene, polyurethane acrylates, polyester acrylates, acrylamide, methacrylic acid, methacrylamide, methyl or ethyl esters of acrylic acid or methacrylic acid, acrylonitrile, and the like. Where the polyacrylate is an interpolymer, acrylic acid is present in the interpolymer at 50 mole % or greater, for example about 50 mole % to 55 mole %, about 50 mole % to 60 mole %, about 50 mole % to 65 mole %, about 50 mole % to 70 mole %, about 50 mole % to 75 mole %, about 50 mole % to 80 mole %, about 50 mole % to 85 mole %, about 50 mole % to 90 mole %, about 50 mole % to 91 mole %, about 50 mole % to 92 mole %, about 50 mole % to 93 mole %, about 50 mole % to 94 mole %, about 50 mole % to 95 mole %, about 50 mole % to 96 mole %, about 50 mole % to 97 mole %, about 50 mole % to 98 mole %, about 50 mole % to 99 mole %. Mixtures of polyacrylates are usefully included in the PDI coating compositions, wherein optimization of monomer content, crosslink density, coatability, viscosity and the like are easily accomplished by mixing various polyacrylates having differing chemical composition, molecular weight, degree of neutralization, or two or more such differences.

In some embodiments polyurethanes or the polyurethane polyacrylates employ one or more hardening or crosslinking mechanisms that are activated by or incidental to drying of the PDI coating composition on a containment surface. In some such embodiments the PDI coating composition is mixed with a crosslinker immediately before coating the containment surface with the PDI coating composition. Suitable crosslinkers in such embodiments included aziridine or carbodiimide based crosslinkers, which are compounds that include two or more aziridine or carbodiimide functionalities. The aziridine and polycarbodiimides facilitated crosslinking takes place upon drying of a PDI coating composition, wherein pH drop during drying of the coated composition activates crosslinking by evaporation of a neutralizing agent such as where the polyacrylate comprises ammonium carboxylate groups, including but not limited to ammonium acrylate residues. The aziridine or polycarbodiimide groups react with the resulting free carboxylic acid to yield a crosslinked polymer residue. Where such crosslinking mechanisms are employed, the aziridine or carbodiimide based crosslinker is added to the PDI coating composition in an amount of about 0.01 wt % to 25 wt % based on the weight of the polyurethane.

Another useful method of hardening or crosslinking the polyacrylate present in a PDI coating composition is to employ multivalent metal counterions of carboxylate residues present in the polyacrylate, such as divalent counterions including zinc, calcium, or magnesium counterions; or trivalent counterions such as aluminum. Such polyacrylates remain dissolved, dispersed, or emulsified in the PDI coating compositions; after coating the compositions on a containment surface, drying yields an ionically crosslinked or hardened polymer residue on a containment surface. Such polyacrylates, when present PDI coating compositions are termed "metal modified polyacrylates". Exemplary metal modified polyacrylates include one or more transition metals, alkaline earth metals, alkali metals, or mixtures thereof. In some embodiments, the metal modified polyacrylate is a zinc modified polyacrylate. In embodiments two or more such metal counterions are associated with a metal modified polyacrylate in a PDI coating composition. In some embodiments, one or more monovalent metal counterions are also present (e.g. Na, Li, K) in a PDI coating composition. Where the PDI coating composition employs a metal modified polyacrylate, about 1 mole % to 20 mole % of carboxylate moieties present in the polyacrylate are associated with a divalent or higher metal counterion after drying the PDI coating composition on a containment surface.

Representative commercially available polyacrylates useful in the PDI coating compositions of the invention (or, in embodiments, useful as the PDI coating composition, where sold as a solution, dispersion, or emulsion) include DURAPLUS® 2 low odor mixed-metal modified polyacrylate, DURAPLUS® 3 zinc modified polyacrylate dispersion, DURAGREEN® MF1 metal free polyacrylate emulsion, PRIMAL® B-336AFK zinc modified polyacrylate, PRIMAL® B-924ER zinc modified polyacrylate emulsion, PRIMAL® E-2483 metal modified polyacrylate, PRIMAL® E-3188 polyacrylate dispersion, PRIMAL® NT-2624 metal-free polyacrylate, PRIMAL® NT-6035 metal-free polyacrylate, RHOPLEX® B-924 metal modified polyacrylate, RHOPLEX® 1421 zinc crosslinked polyacrylate dispersion, RHOPLEX® B-1604 metal-crosslinked modified polyacrylate, RHOPLEX® NT-2624 metal crosslinker-free modified polyacrylate, RHOPLEX® 3479 low foaming metal modified polyacrylate, and UHS Plus® metal modified polyacrylate, all from the Dow Chemical Co. of Midland, Mich.; ACUSOL® 445 polyacrylate sold by Dow Chemical Co.; MEGATRAN® 205 zinc modified polyacrylate dispersion and SYNTRAN® 1580 zinc modified polyacrylate dispersion from Interpolymer Corp.; MORGLO® zinc modified polyacrylate dispersion and MORGLO2® polyacrylate-styrene copolymer emulsion, both from Omnova Solutions Inc.; LAROMER® PE 22 WN polyester-acrylate emulsion from BASF Corp.; VIAKTIN® VTE 6155 aliphatic polyurethane-acrylate and VTE 6165 aromatic polyurethane-acrylate from Solutia, Inc.; 98-283W polyurethane-acrylate from Hans Rahn & Co.; and similar polyacrylate solutions, dispersions, and emulsions. Mixtures of any of the foregoing are suitably employed in the PDI coating compositions of the invention.

In embodiments, the PDI coating composition comprises, consists essentially of, or consists of a polyacrylate (which includes any associated counterions) and water. In embodiments, the PDI coating composition further comprises one or more waxes, preservatives, plasticizers, surfactants/wetting agents, antifoam agents, biocides, and water miscible solvents. In some embodiments the one or more water miscible solvents are coalescing solvents. Useful waxes include emulsified polyethylene waxes and polypropylene waxes typically employed as floor finishing waxes in the industry. Surfactants and wetting agents include silicone and fluorocarbon based compounds known by those of skill to facilitate wetting and leveling of waterborne coatings. Antifoam agents include silicone anti-foam compounds well known to those of skill in the art that are compatible with waterborne coatings.

The PDI coating compositions include at least about 10 wt % polyacrylate and as much as about 50 wt % polyacrylate. In embodiments, the balance of the PDI coating composition is water. The PDI coating composition is advantageously formulated to provide a suitable rheology for ease of coating on vertical and horizontal surfaces without substantial dripping or sagging prior to drying, yet facilitate sufficient flow to provide some leveling of the coating prior to drying. In some embodiments, the PDI coating composition is shear thinning. In some embodiments the PDI coating composition exhibits substantially Newtonian rheology. In some embodiments the PDI coating composition is pseudoplastic. In some embodiments the PDI coating composition is thixotropic. Desired coating rheology is imparted by suitably mixing one or more polyacrylates having different chemical composition, counterion composition, molecular weight, and the like; or by adjusting the composition and/or molecular weight of a single polyacrylate; and further by adjusting the concentration of the one or more polyacrylates in the PDI coating composition.

In some embodiments, the PDI coating composition is supplied to a user as a PDI concentrate, which means that the user adds sufficient water to the PDI concentrate to obtain the desired amount of PDI coating solids and the desired coating rheological properties indicated by the supplier.

In embodiments, the PDI coating composition is a commercially prepared composition comprising a polyacrylate and one or more of waxes, preservatives, plasticizers, surfactants/wetting agents, antifoam agents, biocides, and water miscible solvents. In such embodiments, the coating compositions include at least about 10 wt % polyacrylate and as much as about 50 wt % polyacrylate. Non-limiting examples of useful PDI coating compositions include PADLOCK®, GEMSTAR LASER®, GEMSTAR POLARIS®, RIVET®, MONOSTAR®, and TAJ MAHAL® from Ecolab Inc.; CORNERSTONE® and TOPLINE® from 3M Co.; BETCO BEST® from Betco Corp.; HIGH NOON® from Butchers; CITATION® and CASTLEGUARD® from Buckeye International, Inc., COMPLETE®, SIGNATURE®, TECHNIQUE® and VECTRA® from SC Johnson Professional Products; OVER AND UNDER® from S.C. Johnson Professional Products; SPLENDOR®, DECADE 90®, PRIME SHINE® ULTRA, PREMIER®, FIRST ROUND® and FORTRESS® from Minuteman, International, Inc.; ACRYL-KOTE® Seal and Finish and PREP® Floor Seal from Minuteman, International, Inc.; FLOORSTAR® Premium 25 from ServiceMaster, Inc.; UPPER LIMITS® and ISHINE® from Spartan Chemical Co.; and STAY-CLAD® 5900 dispersion from Reichhold, Inc. Such compositions are suitably used as-is, or by first diluting, or by mixing one or more such compositions with additional components, or by blending one or more such compositions, or a combination of one or more such uses.

Methods of Coating

Disclosed herein is a method comprising coating at least a portion of a crude oil containment surface with a PDI coating composition, drying the PDI coating composition, and optionally repeating the coating and drying one to nineteen times to form a coated containment surface. In some embodiments, according to the above discussion related to crosslinking, the dried coating is crosslinked. The coated containment surface is contacted with a crude oil, wherein the coated containment surface inhibits paraffin deposition thereon during the contact, when compared to the same contact exclusive of the coating. "Same contact exclusive of the coating" herein indicates the comparison of a coated containment surface with an uncoated containment surface, wherein the contact is carried out with the same crude oil under the same conditions of temperature and time, and otherwise using the same conditions during the contacting. Also disclosed herein is a method of inhibiting paraffin deposition on a surface contacted with crude oil, the method comprising coating at least a portion of a crude oil containment surface with a PDI coating composition, drying the composition, optionally repeating the coating and drying one to nineteen times to form a coated containment surface, and contacting the coated containment surface with a crude oil, wherein the coated containment surface inhibits paraffin deposition during the contacting compared to the same contacting exclusive of the coating.

The containment is any article used to contact a crude oil. Containments include by way of example tanks, pipes, pumps, and other articles wherein at least a portion of a surface thereof is intended for contact with a crude oil or may be contacted with a crude oil by occurences such as spills, leaks, equipment repair, equipment changeovers, and the like and so can include e.g. pipe exteriors, repair equipment surfaces, and the like. In some embodiments, a containment surface to be contacted with crude oil comprises, consists of, or consists essentially of metal. In embodiments, the metal containment comprises, consists of, or consists essentially of steel. In embodiments, the steel comprises, consists of, or consists essentially of carbon steel. In embodiments, the metal containment comprises, consists of, or consists essentially of iron. In embodiments, the metal containment comprises or consists essentially of aluminum, zinc, lead, chromium, manganese, nickel, tungsten, molybdenum, titanium, vanadium, cobalt, niobium, copper, or mixtures thereof. In embodiments, the metal containment comprises or consists essentially of metal and one or more of boron, phosphorus, sulfur, silicon, oxygen, nitrogen, and/or mixtures thereof.

In embodiments, the metal containment comprises, consists of, or consists essentially of a pipe. In embodiments, the containment is a device comprising, consisting of, or consisting essentially of metal. In some such embodiments the device is a pressure gauge, a flowmeter, a chemical sensor, or a pump. In embodiments, the metal containment comprises, consists of, or consists essentially of a tank. In embodiments, the tank is a sealed tank: sealed means that the contents of the tank are not open to the air. In embodiments, the contents of the sealed tank are at a pressure that is higher than the ambient environmental air pressure. In embodiments, the contents of the sealed tank are at a pressure that is lower than the ambient environmental air pressure external to the tank. In embodiments, the tank is open to the air and the contents are at ambient environmental air pressure. In embodiments, the tank has an inflow and/or an outflow pipe attached thereto. In embodiments, the metal containment is a railroad tank car, also known as an "oil can" rail car. In embodiments, the metal containment is a tank truck, sometimes known as a tanker.

Applying or coating the PDI coating composition onto one or more crude oil containment surfaces of a containment is carried out using any one or more of a variety of methods, including spraying, flooding, brushing, sponge mopping, and roll coating. In some embodiments, an applying or coating is a first applying or a first coating. In some embodiments, a containment is dip coated, for example a pipe section or a portion of a device. Additionally, the PDI coating composition is suitably applied to a crude oil containment surface by a manufacturer in connection with manufacturing the containment. In some embodiments, where applicable, a crosslinker composition comprising e.g. an aziridine or carbodiimide compound is mixed with the PDI coating composition just before the applying. In some embodiments, the PDI coating composition is diluted with water or a mixture of water and a water miscible solvent prior to the applying. Suitable water miscible solvents include, for example, alkylene glycols and alkylene glycol ethers, and alkanols having 1 to 6 carbons.

Upon applying the PDI coating composition to a crude oil containment surface, a first wet coating is disposed on the crude oil containment surface. In embodiments, the first wet coating thickness is about 25 microns to 1 millimeter, but can be more or less depending on the method of application and the coating rheology of the PDI coating composition applied. The first wet coating is characterized as substantially stationary after the applying. "Substantially stationary" herein means that the wet coating on any surface situated horizontally, vertically, overhead (as in a wet coating on a ceiling or top portion of a containment) or any other position relative to the surface of the earth does not run, drip, or sag substantially between the applying and the drying of the coating due to gravitational forces.

Drying of a wet coating is carried out using any suitable method for evaporating water (and optionally included water miscible solvents) from a waterborne coating. Generally, drying is accomplished by exposing the wet coating to ambient conditions of temperature and pressure, wherein the containment or surface thereof is ventilated. However, additional processes such as forced air ventilation, heating, or both are optionally employed to reduce drying time. Such additional processes are useful, for example, in manufacturing processes, where ambient temperature during the drying is below about 10° C., or where the containment is poorly ventilated. The time period of drying is typically about 15 minutes to 3 hours at temperatures between about 10° C. and 50° C., but can be longer or shorter depending on the percent solids of the coating composition and the thickness of the coating applied to the surface. In some embodiments the dry coatings are substantially dry and may contain e.g. traces of liquid water or a water miscible solvent or both; in other embodiments, the dry coating is partially dry, wherein the dry coating includes between about 1 wt % and 50 wt % of water and/or a water miscible solvent. In embodiments, a dry coating is a first dry coating.

The dry coating weight per unit area for a single dry coating is not particularly limited but in embodiments is adjusted to be about 0.10 g/m$^2$ to 5 g/m$^2$ dry coating weight of solids per coating, or about 0.10 g/m$^2$ to 4.5 g/m$^2$ or about 0.10 g/m$^2$ to 4.0 g/m$^2$, or about 0.10 g/m$^2$ to 3.5 g/m$^2$ or about 0.10 g/m$^2$ to 3.0 g/m$^2$ or about 0.10 g/m$^2$ to 2.5 g/m$^2$ or about 0.10 g/m$^2$ to 2.0 g/m$^2$ or about 0.10 g/m$^2$ to 1.5 g/m$^2$ or about 0.10 g/m$^2$ to 1.0 g/m$^2$, or about 0.25 g/m$^2$ to 5 g/m$^2$, or about 0.50 g/m$^2$ to 5 g/m$^2$, or about 0.70 g/m$^2$ to 5 g/m$^2$, or about 0.80 g/m$^2$ to 5 g/m$^2$, or about 0.90 g/m$^2$ to 5 g/m$^2$, or about 1.00 g/m$^2$ to 5 g/m$^2$, or about 0.5 g/m$^2$ to 2.5 g/m$^2$, or about 0.50 g/m$^2$ to 2.0 g/m$^2$, or about 0.50 g/m$^2$ to 1.5 g/m$^2$, or about 0.70 g/m$^2$ to 1.5 g/m$^2$. It will be appreciated that the dry coating thickness is subject to variation over a coated area depending on many factors including concentration of the coating composition, temperature during and after coating, method of coating, and disposition of the coated surface (e.g. horizontal vs. vertical orientation). It will be appreciated by one of skill in the art that the coating weights set forth herein represent average coating thicknesses or exemplary coating thicknesses.

In some embodiments, a first wet coating is applied to a crude oil containment surface, followed by a first drying to form a coated containment surface comprising, consisting of, or consisting essentially of a first dry PDI coating; then a second wet coating is applied substantially contiguously to the first dry PDI coating, followed by a second drying step to form a second dry PDI coating contiguous to the first dry PDI coating. As used herein, the term "contiguous" means adjacent and in touching relation thereto; for example, where a second coating is applied substantially on top of a first coating, the second coating is applied contiguously to the first coating. In some embodiments, the first and second PDI coatings are derived from the same PDI coating composition; in other embodiments, the first and second PDI coatings are derived from compositionally different PDI coating compositions. The different PDI coating compositions differ in one or more of the following: concentration of one or more components, chemical composition of one or more components, presence or absence of one or more components, pH, or rheological properties. In some embodiments, the first and second wet coatings are applied at substantially the same coating thickness; in other embodiments different coating thicknesses are applied as selected by the user. In some embodiments, the first and second wet coatings are applied at substantially the same coating method; in other embodiments different coating methods are applied as selected by the user. It will be understood that second and subsequent coatings are optional here and are suitably selected by the user to provide the needed amount of paraffin deposition inhibition by the containment where contacted with crude oil source(s).

Using the compositions and methods described above, third, fourth, fifth, sixth, seventh, eighth, ninth, tenth, eleventh, twelfth, thirteenth, fourteenth, fifteenth, sixteenth, seventeenth, eighteenth, nineteenth, and twentieth PDI coatings are optionally and suitably further applied to the containment substantially as described above, as selected by the user and applied using one or more coating methods, one or more coating thicknesses, one or more different PDI coating compositions, one or more periods of drying between coatings, and the like. Each of the optional second and subsequent wet coatings are applied contiguous to a predecessor dry coating. Each predecessor dry coating is a PDI coating.

The coated containment surfaces therefore comprise between one and twenty contiguous PDI coatings, that is, 1-20 contiguous coatings, or 1-3, 1-4, 1-5, 1-6, 1-7, 1-8, 1-9, 1-10, 1-11, 1-12, 1-13, 1-14, 1-15, 1-16, 1-17, 1-18, 1-19, 2-20, 3-20, 4-20, 5-20, 6-20, 7-20, 8-20, 9-20, 10-20, 11-20, 12-20, 13-20, 14-20, 15-20, 16-20, 17-20, 18-20, 19-20, 3-5, 3-10, 3-15, 4-5, 4-10, 4-15, 5-10, 5-15, 6-10, 6-15, 7-10, 7-15, 7-17, 8-10, 8-15, 8-17, 9-10, 9-15, 9-17, 10-15, 10-17, 10-18, 10-19, 11-15, 11-18, 12-15, 12-18, 13-15, 13-18, 14-15, 14-18, 15-17, 15-18, or 15-19 contiguous coatings, wherein each wet coating is at least partially dried prior to applying a subsequent wet coating, and wherein each of the second and subsequent wet coatings are applied contiguously to a predecessor dry PDI coating. Each of the one to twenty coatings applied are derived from the same or different PDI coating compositions, depending on the selection of the user. After one to twenty such discrete coating applications, the coated containment surface exhibits reduced paraffin deposition when subsequently contacted with crude oil.

Use of the Coated Containments

The coated containment surfaces of the invention inhibit paraffin deposition thereon when contacted with a crude oil. Inhibition of paraffin deposition is determined by comparing a coated containment surface contacted with a crude oil to the same contact exclusive of the coating; a reduction in the weight of paraffin deposited on the coated surface is expressed as a weight percent inhibition. In such comparisons, the reduction in the weight of paraffin deposited on a coated containment surface is at least 10% by weight and as much as 99% by weight for the same unit of surface area when compared to the same contact exclusive of the coating including one or up to twenty contiguous coatings as described above. In embodiments, the weight percent inhibition realized depends at least upon on the temperature of the containment surface during the contact, temperature of the crude oil during the contact, and the length of time the crude oil remains in contact with the coated containment surface.

The temperature of a containment for crude oil during the contact between the crude oil and the crude oil containment surface (whether coated or uncoated) is typically, though not always, dependent on ambient conditions proximal to the containment. Thus in some embodiments, the temperature of a crude oil containment surface is substantially the same as that of the surrounding ambient environment, at least prior to contact with the crude oil. Such ambient environment temperatures often range between about 60° C. to −40° C., though not limited thereto. In some embodiments the temperature of a crude oil contacting a crude oil containment surface is similar to, or substantially the same as, the temperature of the crude oil containment surface. In other embodiments, the temperature of a crude oil contacting a crude oil containment surface is greater than that of the crude oil containment surface. This is particularly likely to be the case where a crude oil is extracted from a subterranean reservoir where the temperature of the crude oil upon extraction is greater than the ambient air temperature above the surface of the earth, further wherein the crude oil is transported into a waiting containment that is equilibrated at ambient air temperature. In still other embodiments, the the temperature of a crude oil contacting a crude oil containment surface is lower than that of the crude oil containment surface. Under any of these conditions, it will be understood that lower temperatures of the crude oil, the containment, or both in general lead to an increase in paraffin deposition on the crude oil containment surface compared to deposition observed at higher temperatures. It is a feature of the invention that the coated containment surfaces are particularly effective at inhibiting paraffin deposition at temperatures below about 0° C., for example 0° C. to −40° C.

The period of contact of a crude oil source with a containment varies from a fraction of a second (such as crude oil flowing through a pipe, wherein the crude oil composition is variable) to several days in general, but may extend for a year or more. During the contact, paraffin deposition may increase or decrease, depending on changes in ambient temperature conditions proximal to the containment and temperature differentials that exist or develop between the crude oil and the containment surface during the contact. The period of contacting is not particularly limited but comparisons between uncoated and coated crude oil containment surfaces are suitably made by taking both temperature and period of contact into account.

It is a feature of the coated containment surfaces of the invention that in any of the recited conditions of temperature and period of contact, paraffin deposition is inhibited by at least 10 wt % compared to the weight of paraffin deposited on an uncoated surface using the same conditions of contacting. Depending on the particular coated containment surface, when compared to an uncoated containment surface subjected to the same conditions of contact, the coated containment surfaces of the invention reduce paraffin deposition by about 10 wt % to 99 wt %, or about 20 wt % to 99 wt %, or about 30 wt % to 99 wt %, or about 40 wt % to 99 wt %, or about 50 wt % to 99 wt %, or about 60 wt % to 99 wt %, or about 70 wt % to 99 wt %, or about 80 wt % to 99 wt %, or about 90 wt % to 99 wt %, or about 95 wt % to 99 wt %, or about 10 wt % to 95 wt %, or about 10 wt % to 90 wt %, or about 10 wt % to 80 wt %, or about 10 wt % to 70 wt %, or about 10 wt % to 60 wt %, or about 10 wt % to 50 wt %, or about 10 wt % to 40 wt %, or about 10 wt % to 30 wt %, or about 10 wt % to 20 wt %.

As mentioned above, no paraffin inhibiting compounds are required to be present in the crude oil source itself in order to realize the paraffin deposition inhibition provided by the coated containment surfaces of the invention. Accordingly, in embodiments, the crude oil source contacted with the coated containment surface excludes a paraffin inhibitor. However, in other embodiments a paraffin inhibiting compound (paraffin inhibitor) is included in the crude oil source, wherein the deposition of paraffin on the containment surfaces is further reduced by the inclusion of the paraffin inhibitor in the crude oil. Any of the paraffin inhibitor compounds commonly employed by those of skill are useful herein to further inhibit paraffin deposition from a crude oil. Non-limiting examples of such paraffin inhibiting compounds include polymers The coated containments of the invention provide long-term inhibition of paraffin deposition. That is, the coatings are not dissolved substantially by the crude oil source. Further, since the containment coating remains stationary on the containment surface, the paraffin deposition inhibitive properties of the coating are not transient and do not require constant monitoring during flow of the crude oil into, out of, or through the containment. In this sense, the coated containments provide a substantial benefit over the use of conventional paraffin inhibitors: there is no need for constant monitoring of the crude oil source to ensure there is sufficient paraffin inhibitor compound(s) present to inhibit paraffin formation in the presence of one or more surfaces where it can subsequently be deposited. The coated containments are effective to inhibit deposition of paraffin for at least one week and as long as 10 years of constant contact and/or flow of one or more crude oil sources into, out of, or through the containment, depending on frequency or consistency of use, the particular containment surface, and the specific chemical content of the crude oil product contacted with the containment.

EXPERIMENTAL

General Procedure

A cold finger apparatus was used to measure paraffin deposition. A crude oil sample is placed in a warm bath while a chilled metal finger is inserted into the crude oil sample. The temperature gradient created across the metal surface and the bulk oil sample tends to induce paraffin deposition onto the cold finger. To show the effect of the coatings of the invention, a subject coating is applied to the cold finger prior to starting the above test. Then the difference in the amount of solid deposited on the cold finger during the test is compared to the amount of solid deposited in the absence of the coating. A percent inhibition is calculated from the ratio of the weights of solid present on the cold finger with and without the coating.

The equipment used for the tests is listed in Table 1.

TABLE 1

Equipment used in the cold finger test

| Equipment | Description/Use |
|---|---|
| Glass jars | To contain 100 mL crude oil sample |
| Stir bars | To mix sample during test |
| Recombined Eagle Ford crude oil | Source of paraffin deposition |
| Paper towels | Used to remove wax deposit from finger |
| Ruler | To measure height of deposit |
| Heatedwater bath ($T_{hot}$) | To heat sample jar during test |
| Cold finger (connected to $T_{cold}$) | Apparatus to run test |
| Refrigerated circulating glycerol-water bath ($T_{cold}$) | To circulate cold glycerol water through finger |

A stainless steel cold finger (not yet temperature adjusted) was coated with five coatings of a selected coating composition. For each of the five coatings, the finger was dipped into the coating composition and then allowed to dry under ambient conditions while holding the finger vertical for 1 hour. Coating compositions applied in this manner to the finger are shown in Table 2. The coating weight for each of the five dry coatings was found to be about 1.20 g/m$^2$ for a 20 wt % solids coating.

TABLE 2

Coating compositions employed as-is to coat the cold finger

| Product | Manufacturer |
|---|---|
| GEMSTAR ® LASER ® | Ecolab Inc., Eagan, MN |
| ACUSOL ® 445 | Dow Chemical Co., Midland, MI |
| RIVET ® Concrete Sealer | Ecolab Inc., Eagan, MN |
| Matte Floor Finish | Ecolab Inc., Eagan, MN |
| FIRST BASE ® | Ecolab Inc., Eagan, MN |
| MONOSTAR ® | Ecolab Inc., Eagan, MN |

Then coolant was flowed through the cold finger from the refrigerated circulating glycerol-water bath, which was set to 6° C.; and 100 mL of a crude oil sample (recombined crude from the Eagle Ford shale formation in Texas) was weighed into a sample jar, then the jar was added to the heated water bath ($T_{hot}$) set to 40° C. Once the crude oil reached the target temperature, the cold finger was immersed in the crude oil while the crude oil was stirred at 180 rpm. The immersion was continued for 24 hours. Then the cold finger was removed, the immersed section thereof blotted with a paper towel, and the finger allowed to equilibrate to ambient temperature while being held vertically; a specimen cup was tared and placed under the finger to catch any residue that dripped from the finger as the finger warmed. The finger was allowed to sit for one hour over the specimen cup.

The height of the paraffin deposition on the finger was recorded so that any differences in surface area contacted by the crude oil could be normalized, and the appearance of solids deposited on the finger was noted. Then a paper towel was tared and used to remove the waxy solid from the finger; the total weight of waxy solid from the specimen cup plus the paper towel was calculated. Then the difference between weight of waxy solid collected from an uncoated finger and that collected from the coated finger is expressed as a percent inhibition, which is the same as the percent weight reduction in solids deposited on the finger in the presence of the coating. Percent inhibition of paraffin deposition for various coatings is shown in Table 3. In each case, the paraffin deposited on the finger was observed to be a non-uniform coated mass that was not sticky. The GEMSTAR® LASER® coating resulted in paraffin deposition that appeared to be smoother than the other deposited paraffins and also more uniform.

TABLE 3

Results of paraffin deposition inhibition according to the general procedure outlined above for the indicated coatings.

| Coating Composition | Crude Oil Deposition Height, cm | Weight of Paraffin Deposited, g | Wt % Paraffin Inhibition (based on Control 1) | Wt % Paraffin Inhibition (based on Control 2) |
|---|---|---|---|---|
| None (Control 1) | 4.9 | 2.07 | NA | NA |
| None (Control 2) | 4.8 | 2.10 | NA | NA |
| GEMSTAR ® LASER ® | 4.5 | 1.33 | 30 | 32 |
| ACUSOL ® 445 | 5 | 1.43 | 32 | 35 |
| RIVET ® Concrete Sealer | 4.7 | 2.42 | −22 | −18 |
| Matte Floor Finish | 5.3 | 3.45 | −54 | −49 |
| FIRST BASE ® | 4.7 | 3.15 | −59 | −53 |
| MONOSTAR ® | 4.2 | 1.73 | 2 | 6 |

The products GEMSTAR® LASER®, ACUSOL® 445, and MONOSTAR® inhibited paraffin deposition on the cold finger when compared to the uncoated cold finger. The LASER® and ACUSOL® coatings performed better than MONOSTAR® and exhibited greater than 30 wt % inhibition of paraffin deposition when compared to an uncoated stainless steel surface. Providing more than 5 contiguous coatings, providing heavier coating weights, or mixing coating types will result in paraffin inhibition by the remaining coatings listed in Table 2 as well as improved performance of MONOSTAR®.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

The invention claimed is:

1. A containment comprising
   a. a coated containment surface, the coated containment surface comprising about 0.1 g to 5 g of a coating per square meter of the coated surface, wherein the coating comprises a polyacrylate that is a homopolymer of acrylic acid or a conjugate base thereof, an interpolymer of acrylic acid comprising at least about 50 mole % acrylic acid or a conjugate base thereof, or a mixture thereof; and
   b. a crude oil contacting the coated containment surface.

2. The containment of claim 1 wherein the crude oil containment surface comprises a metal.

3. The containment of claim 2 wherein the metal is a stainless steel.

4. The containment of claim 1 wherein the polyacrylate is crosslinked.

5. The containment of claim 1 wherein the polyacrylate is a copolymer of acrylic acid and styrene.

6. The containment of claim 1 wherein the coating further comprises a polyethylene wax or a polypropylene wax.

7. The containment of claim 1 wherein the coated containment surface temperature is 0° C. to −40° C.

8. The containment of claim 1 wherein the coated containment surface inhibits paraffin deposition from the crude oil when compared to the same contact exclusive of the coating.

9. The containment of claim 1 wherein the coated containment surface inhibits 10 wt % to 90 wt % of paraffin based on the same contact surface exclusive of the coating.

* * * * *